United States Patent [19]
Keating

[11] Patent Number: 6,072,538
[45] Date of Patent: Jun. 6, 2000

[54] DIGITAL IMAGE ENHANCEMENT

[75] Inventor: Stephen Mark Keating, Reading, United Kingdom

[73] Assignees: Sony Corporation, Tokyo, Japan; Sony United Kingdom Limited, Weybridge, United Kingdom

[21] Appl. No.: 08/898,335

[22] Filed: Jul. 22, 1997

[51] Int. Cl.[7] .................................................. H04N 5/208
[52] U.S. Cl. ........................................ 348/625; 382/266
[58] Field of Search .................................. 348/625, 627, 348/630, 631, 607, 606, 720; 382/266, 267, 268, 263, 269; H04N 5/208

[56] References Cited

U.S. PATENT DOCUMENTS

| | | | |
|---|---|---|---|
| 5,200,824 | 4/1993 | Kageyama | 348/625 |
| 5,491,520 | 2/1996 | Nozawa et al. | 348/625 |
| 5,559,563 | 9/1996 | Takahashi et al. | 348/625 |
| 5,767,900 | 6/1998 | Tanji et al. | 348/625 |

*Primary Examiner*—Michael H. Lee
*Attorney, Agent, or Firm*—Frommer Lawerence & Haug, LLP.; William S. Frommer

[57] ABSTRACT

Digital image enhancement apparatus for processing an input sampled image signal having an input sample rate to generate an output, enhanced, image signal at the input sample rate comprises one or more filters for filtering and sample rate up-converting the input image signal to generate a detail signal at an intermediate sample rate higher than the input sample rate and for generating an intermediate image signal, the intermediate image signal being a sample rate up-converted version of the input image signal; a detecting circuit for detecting whether a combination of the detail signal and the intermediate image signal goes beyond predefined limits on the signal level of the output image signal and, if so, for modifying the detail signal so that a combination of the detail signal and the intermediate image signal would not go beyond the predefined limits on the signal level of the output image signal; a sample rate down-converter for converting the detail signal to a down-converted detail signal at the input sample rate; and a combiner for combining the input image signal with the down-converted detail signal at the input sample rate, to generate the output image signal.

7 Claims, 6 Drawing Sheets

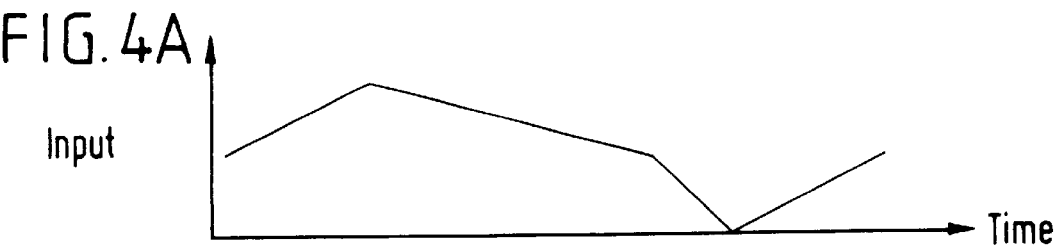
FIG.4A. Input
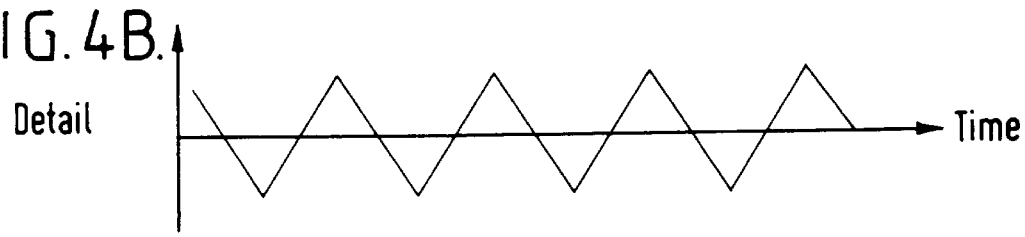
FIG.4B. Detail
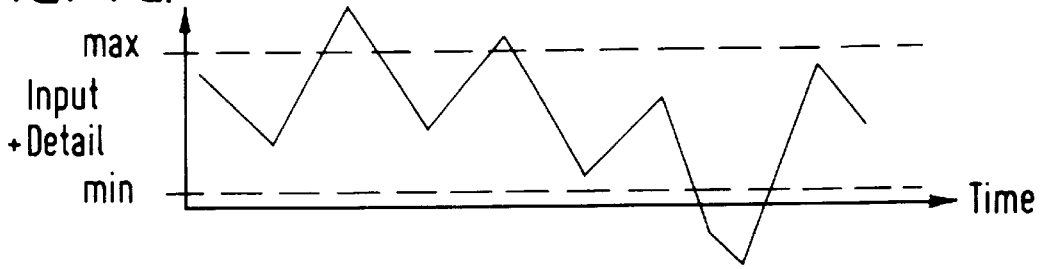
FIG.4C. Input +Detail max min
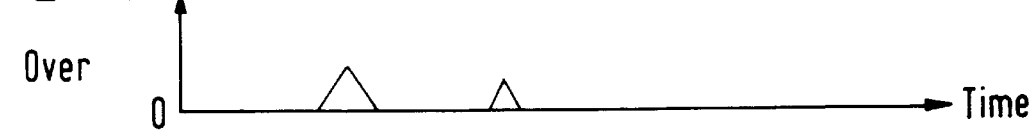
FIG.4D. Over
FIG.4E. Under
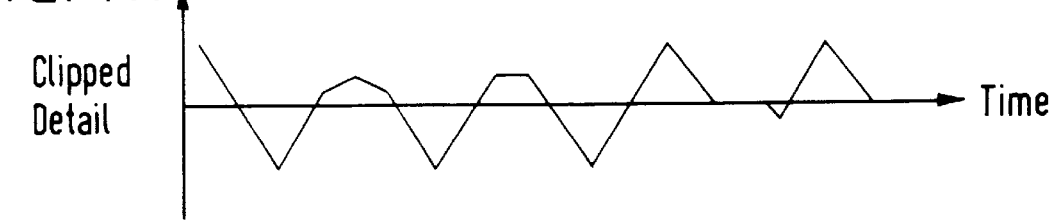
FIG.4F. Clipped Detail

DIGITAL IMAGE ENHANCEMENT

BACKGROUND OF THE INVENTION

1. Field of the Invention

This invention relates to digital image enhancement.

2. Description of the Prior Art

Image enhancement is often used to improve the subjective portrayal of detail in a video or still image. Here, however, and throughout this specification, the term "enhance" simply means to apply various processing techniques to change the portrayal of detail or the relative portrayal of different spatial frequencies within the image. It does not necessarily imply any absolute or even any other improvement in the image, although often the aim is to provide at least a subjective improvement.

A basic previously proposed technique for electronic image enhancement is first to separate out certain spatial frequency bands in an input image signal using, for example, one or more high-pass or band-pass filters, in order to generate a "detail" signal containing frequency components of the image considered to be most representative of image detail. The detail signal is then scaled and added to the original image signal. The result is that the level of the frequency components considered to be most representative of image detail is increased in the output, enhanced, image with respect to other frequency components of the image.

An example apparatus of this type is schematically illustrated in FIG. 1 of the accompanying drawings, in which an input video signal is supplied in parallel to a band-pass filter and an adder 20 (possibly via a compensating delay device—not shown). The band-pass filter filters certain frequency bands of the video signal to generate a detail signal. The magnitude of the detail signal is then adjusted at a multiplier 30, by multiplying the detail signal by a "detail gain" coefficient. The gain-adjusted detail signal is then added to the original input video signal at the adder 20, and finally the resulting "enhanced" signal is supplied to a clipping circuit 40 where the level of the enhanced signal is clipped if it goes beyond predefined upper or lower limits on signal level.

A problem lies in the final stage of clipping of the enhanced image signal. This clipping is necessary in the apparatus of FIG. 1 because the addition of the detail signal to the original image signal can increase the amplitude of the resulting enhanced image signal beyond allowable limits—e.g. beyond a predetermined peak white level or below a predetermined black level. However, the clipping operation is a highly non-linear process and so can introduce distortions to the image signal. In a digital (sampled) system, the clipping process can also introduce frequency harmonics above the Nyquist limit; when the signal is finally converted back to analogue form (e.g. for display) these harmonics can give rise to subjectively disturbing alias distortions within the image.

In an attempt to avoid the harmonics and alias distortions introduced by the clipping process, it has been proposed that the input sampled image signal is up-converted or super-sampled before enhancement, to be sub-sampled back to the original sampling rate afterwards. An example of an apparatus for carrying out this process is shown schematically in FIG. 2 of the accompanying drawings.

In FIG. 2, the input video signal is supplied first to an interpolator or sample rate up-converter 50. This generates an intermediate "super-sampled" video signal having a higher sample rate than the input video signal. Importantly, this increase in sample rate also means that the Nyquist limit for the intermediate video signal is higher than that for the input video signal.

The intermediate video signal is then processed in a similar manner to that shown in FIG. 1, whereby it is band-pass filtered 10', the resulting detail signal is multiplied 30' by a gain coefficient, and the gain-controlled detail signal is added 20' to the intermediate video signal, with the resulting signal being clipped 40'.

A final step is that the output of the clipping circuit 40' is supplied to a decimating or sample rate down-converting filter 60, where the higher sample rate of the output signal from the clipping circuit 40' is down-converted to the sample rate of the original input video signal.

However, the disadvantage of super-sampling the video signal is that the super-sampling filter (interpolator) and the subsequent downsampling or decimation filter affect the frequency response of the image signal whether or not enhancement is applied. This can be alleviated by making the filters very large, i.e. using a very large number of filter taps, but this has the further disadvantages of adding a significant delay to the image signal (important in the case of video signal enhancement) and that the filters then require a very large amount of memory.

SUMMARY OF THE INVENTION

This invention provides digital image enhancement apparatus for processing an input sampled image signal having an input sample rate to generate an output, enhanced, image signal at the input sample rate, the apparatus comprising:

one or more filters for filtering and sample rate up-converting the input image signal to generate a detail signal at an intermediate sample rate higher than the input sample rate and an intermediate image signal, the intermediate image signal being a sample rate up-converted version of the input image signal;

a detecting circuit for detecting whether a combination of the detail signal and the intermediate image signal goes beyond predefined limits on the signal level of the output image signal and, if so, for modifying the detail signal so that a combination of the detail signal and the intermediate image signal would not go beyond the predefined limits on the signal level of the output image signal;

a sample rate down-converter for converting the detail signal to a down-converted detail signal at the input sample rate; and a combiner for combining the input image signal with the down-converted detail signal at the input sample rate, to generate the output image signal.

In the invention, the processing necessary to produce the detail signal is carried out on an intermediate, super-sampled image signal. This means that the "main" signal path—from the input image signal to the combiner—is not compromised by a sample rate up-conversion and subsequent down-conversion operation.

Because the sample rate up-conversion and down-conversion operations are used only to generate the detail signal, the quality requirements on the filters used are greatly relaxed. This means that "shorter" (fewer tap) filters can be used, reducing the hardware requirements and improving the signal delay of the enhancement apparatus.

Furthermore, the super-sampled detail signal is modified so that a combination of the super-sampled detail signal and the intermediate, super-sampled image signal would not go beyond predefined limits applying to the signal level of the output (not super-sampled) image signal. The modified detail signal is then down-converted to the input sample rate before being combined with the input image signal.

This means that the clipping operation is effectively carried out in the super-sampled domain, in that the super-sampled detail signal is modified so that a clipping operation is not necessary when the down-sampled detail signal is subsequently combined with the input image signal. So, any harmonics and distortions generated by the non-linear "modifying" operation applied to the detail signal are introduced into a detail signal having a higher sampling frequency (and so a higher Nyquist limit) so that they are less likely to give rise to alias distortions in the output, enhanced, image signal.

This invention also provides a method of digital image enhancement for processing an input sampled image signal having an input sample rate, the method comprising the steps of:

filtering and sample rate up-converting the input image signal to generate a detail signal at an intermediate sample rate higher than the input sample rate and an intermediate image signal, the intermediate image signal being a sample rate up-converted version of the input image signal;

detecting whether a combination of the detail signal and the intermediate image signal goes beyond predefined limits on the signal level of the output image signal and, if so, modifying the detail signal so that a combination of the detail signal and the intermediate image signal would not go beyond the predefined limits on the signal level of the output image signal;

sample rate down-converting the detail signal to a down-converted detail signal at the input sample rate; and combining the input image signal with the down-converted detail signal at the input sample rate, to generate an output image signal.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 4a to 4f schematically illustrate waveforms for explaining the operation of the apparatus of FIG. 3;

DESCRIPTION OF THE PREFERRED EMBODIMENTS

Figure 1:
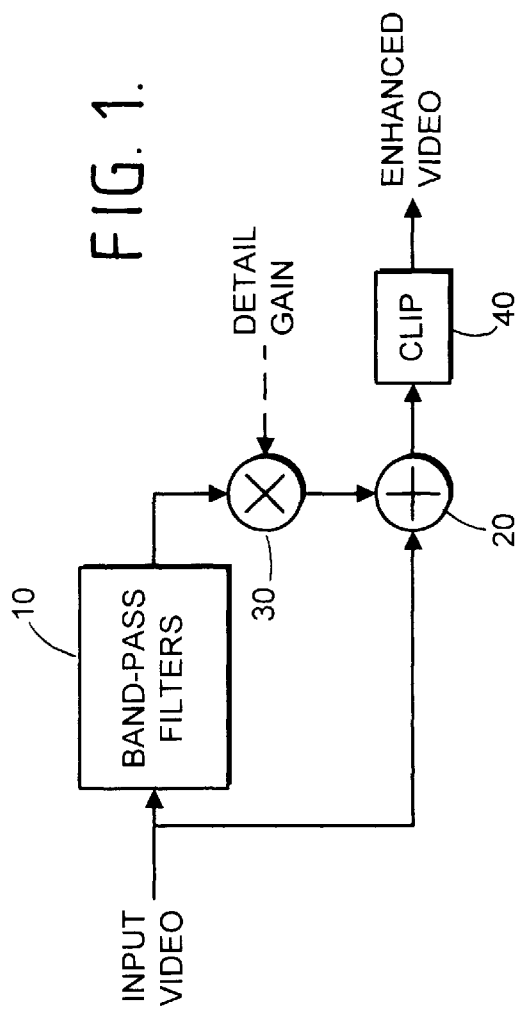
FIG. 1 is a schematic diagram of a previously proposed simple image enhancement apparatus.
Figure 2:
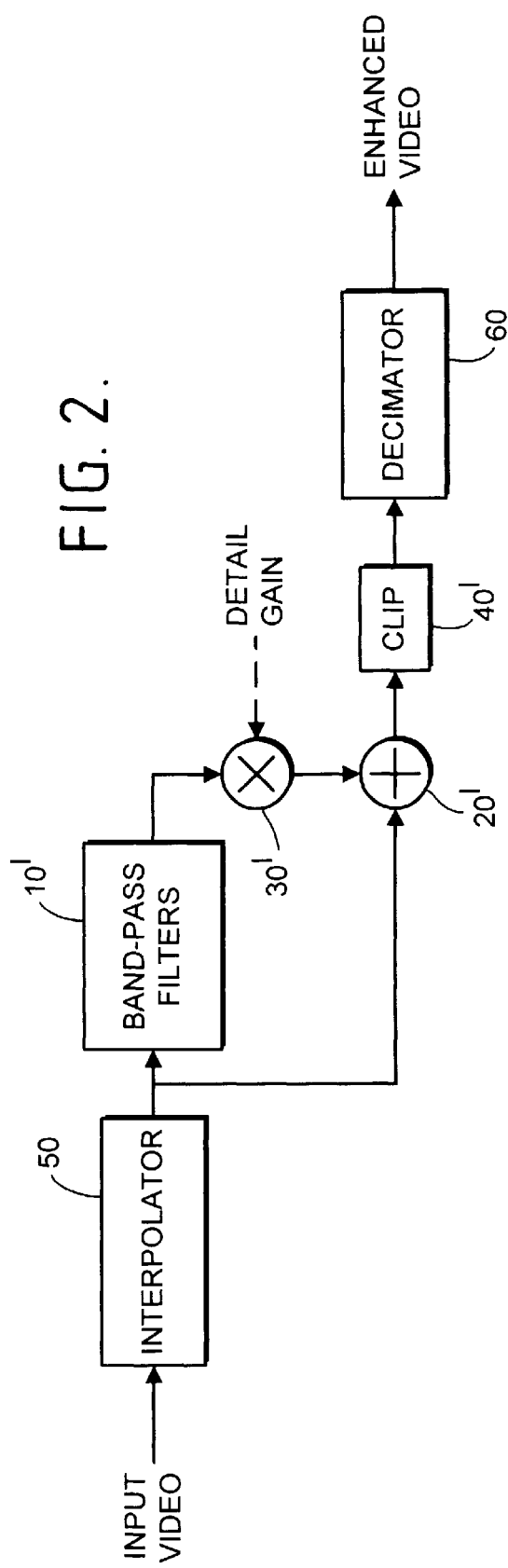
FIG. 2 is a schematic diagram of a previously proposed super-sampling image enhancement apparatus.
Figure 3:
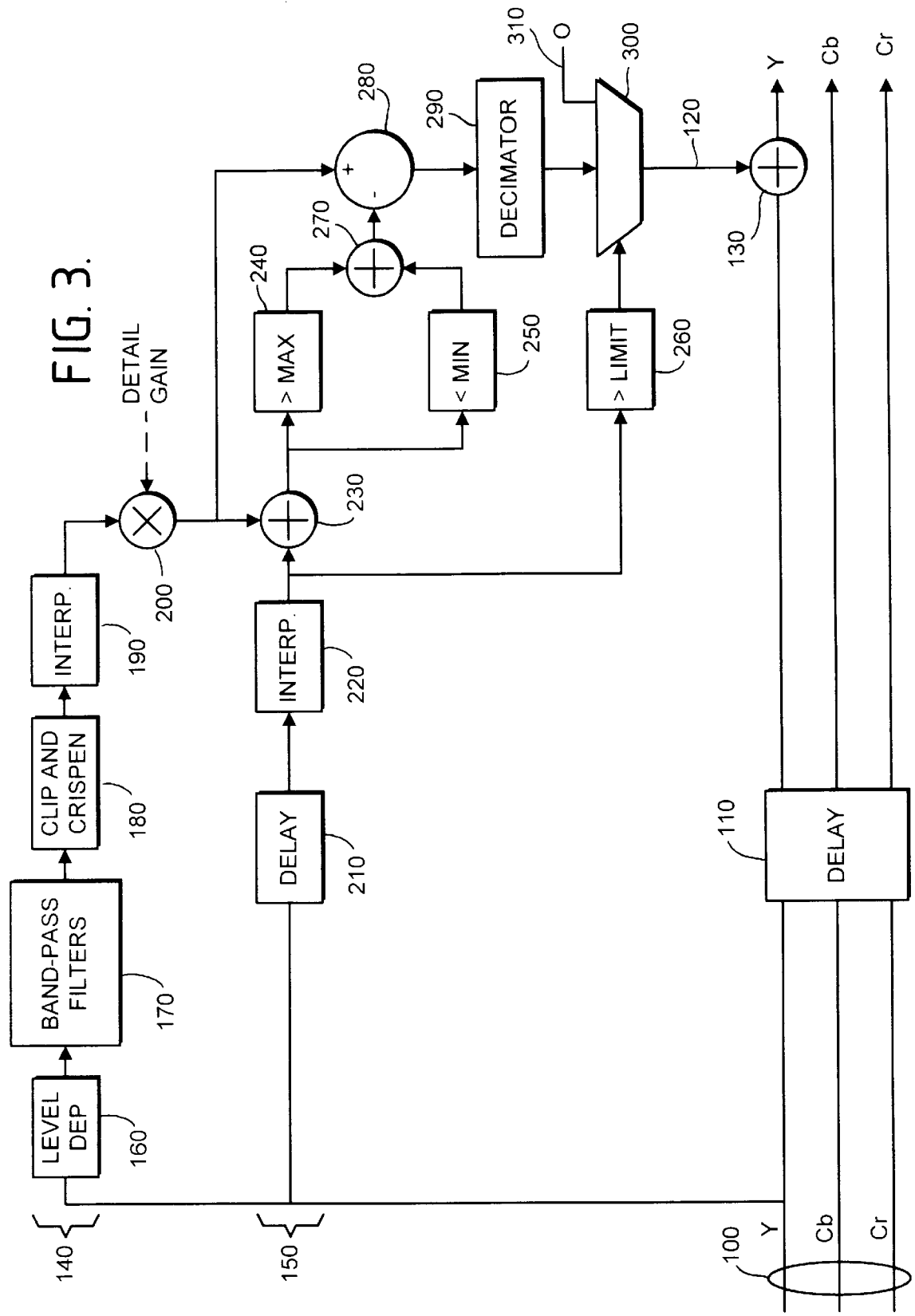
FIG. 3 is a schematic diagram of an image enhancement apparatus according to an embodiment of the present invention.

FIG. 3 is a schematic diagram of an image enhancement apparatus according to an embodiment of the present invention.

The apparatus receives an input video signal 100 comprising luminance (Y) and chrominance (Cb and Cr) components.

The components of the input signal 100 are supplied to a compensating delay element 110 to compensate for the delay of the image enhancement process. From the delay element 110, the chrominance components Cb and Cr are supplied directly for output.

For the luminance component Y, image enhancement is applied to that component and an enhancement signal 120 (to be described in detail below) is added to the delayed luminance component from the compensating delay 110 by an adder 130 to generate an output luminance signal.

The image enhancement process applied to the luminance signal Y will now be described.

The luminance component Y for enhancement is supplied in parallel to two processing paths 140, 150. In the processing path 140, the luminance signal is supplied first to a non-linear level dependence device 160. This device will be described below with reference to FIG. 8. At the output of the device 160, the signal is supplied to one or more band-pass filters 170 which filter the luminance signal to generate a detail signal comprising certain spatial frequency bands of the luminance signal. The detail signal is passed to a clip and crispening device 180. The operation of the device 180 will be described below with reference to FIG. 7. Finally, the output of the clipping and crispening device 180 is passed to an interpolator or super-sampling filter 190 where the sample rate of the signal is up-converted to a higher sample rate than that of the input luminance signal.

The super-sampled signal at the output of the interpolator 190 is supplied to a multiplier 200 where it is multiplied by a coefficient representing a gain amount to be applied to the detail signal.

In the processing path 150, the luminance signal Y is subjected to a compensating delay 210, to compensate for the delays imposed by the level dependence device 160, the band-pass filters 170 and the clipping and crispening device 180. The delayed luminance signal at the output of the delay device 210 is supplied to an interpolator 220 identical in operation to the interpolator 190 which generates a super-sampled version of the luminance signal, delayed so as to be temporally coincident with corresponding samples of the detail signal from the multiplier 200.

The detail signal from the multiplier 200 and the super-sampled luminance signal from the interpolator 220 are added by an adder 230. The output of the adder 230 is supplied in parallel to three comparator devices 240, 250 and 260.

In the comparator device 240, the output of the adder 230 is compared with an upper limit on signal level (MAX). If the output of the adder 230 is less than or equal to the MAX signal level, the output of the device 240 is zero. If the output of the adder 230 is greater than the signal level MAX, then the device 240 outputs the amount by which the signal level exceeds the signal level MAX.

Similarly, if the output of the adder 230 is greater than or equal to a lower limit signal level MIN, then the device 250 outputs zero. If the output of the adder 230 is less than the signal level MIN, then the device 250 outputs the amount by which the signal from the adder 230 is below the minimum signal level MIN.

The outputs of the comparators 240 and 250 are supplied to an adder 270 where they are added together before being subtracted from the detail signal by a subtracter 280.

So, the output of the subtracter 280 is a super-sampled detail signal which is (where necessary) clipped so that a sum of the detail signal and the luminance signal Y does not go beyond the upper and lower signal level limits MAX and MIN.

The output of the subtracter 280 is then decimated or sub-sampled to the sample rate of the original luminance signal Y by a decimator 290. The output of the decimator 290 is supplied to a multiplexer 300 which selects either the output of the decimator 290 or a zero input signal 310.

The operation of the multiplexer 300 is controlled by the third comparator 260 which detects whether the super-sampled luminance signal output by the interpolator 220 is greater than a maximum signal level "limit".

The signal level "limit" is, for example, 105% of the maximum allowable signal level for the luminance signal. If the supersampled luminance signal plus the detail signal exceeds this level "limit" then the detail signal is set to zero by the multiplexer 300 and no detail signal is added to the luminance signal.

The reason for this is to avoid clipping high levels in the source luminance signal; if any clipping takes place it should be caused only by the addition of the detail signal.

To explain this, in the present example the luminance signals are represented by 10-bit binary values. The maximum excursion of a 10-bit number is 1023, but a reference white level is defined as a binary value of 940 (=100%). So, the signal can exceed reference white level by (1023–940), so that a luminance signal value of 1023 is equivalent to 109% of reference white level.

As the decimator 290 may suffer from some overshoot the level MAX is set to less than 1023—in this case to 990 (=105% of reference white level) so that the decimated signal would still be below the 1023 level and not cause an overflow.

However, peak levels in the source luminance signal should still be allowed to exceed 105%—they should be allowed to reach 109%. Therefore, if the super-sampled luminance signal is found to exceed 105% then the clipped detail signal is set to zero to avoid clipping the source luminance signal.

The output of the multiplexer 300 forms the enhancement signal 120 which is added to the delayed luminance signal from the compensating delay 110 by the adder 130 to form the output luminance signal.

This means that the clipping operation is effectively carried out in the super-sampled domain, in that the super-sampled detail signal is modified so that a clipping operation is not necessary when the down-sampled detail signal is subsequently combined with the input image signal. So, any harmonics and distortions generated by the non-linear "modifying" operation applied to the detail signal are introduced into a detail signal having a higher sampling frequency (and so a higher Nyquist limit) so that they are less likely to give rise to alias distortions in the output, enhanced, image signal.

FIGS. 4a to 4f schematically illustrate waveforms for explaining the operation of the apparatus of FIG. 3.

FIG. 4a schematically illustrates an example of an input luminance signal. FIG. 4b schematically illustrates the super-sampled detail signal output by the multiplier 200.

At the adder 230, a super-sampled version of the input signal is added to the detail signal. The output of the adder 230 is shown schematically in FIG. 4c. FIG. 4c also schematically illustrates the upper and lower signal levels MAX and MIN used by the comparators 240 and 250. It can be seen from FIG. 4c that the sum of the super-sampled input luminance signal and the detail signal exceeds the upper signal level MAX at two positions on FIG. 4c and goes below the lower signal level MIN at one position on FIG. 4c.

FIG. 4d schematically illustrates the output of the comparator 240, which is zero except when the output of the adder 230 exceeds the upper signal level MAX, in which case the comparator 240 outputs the amount by which the signal exceeds the upper signal level MAX.

Correspondingly, FIG. 4e illustrates the output of the comparator 250, which is zero except when the signal goes below the lower signal level MIN, in which case the comparator 250 outputs the amount by which the signal level goes below the level MIN.

The sum of the outputs of the comparators 240 and 250 is generated by the adder 270 and is subtracted from the detail signal at the subtracter 280. This forms a clipped detail signal which is shown schematically in FIG. 4f at the output of the subtracter 280.

So, once the signal of FIG. 4f is sub-sampled and added to the luminance signal at the adder 130, the result is an image-enhanced luminance signal which does not exceed the upper and lower signal level limits, and does not require clipping in the non-super-sampled domain.

Figure 5:
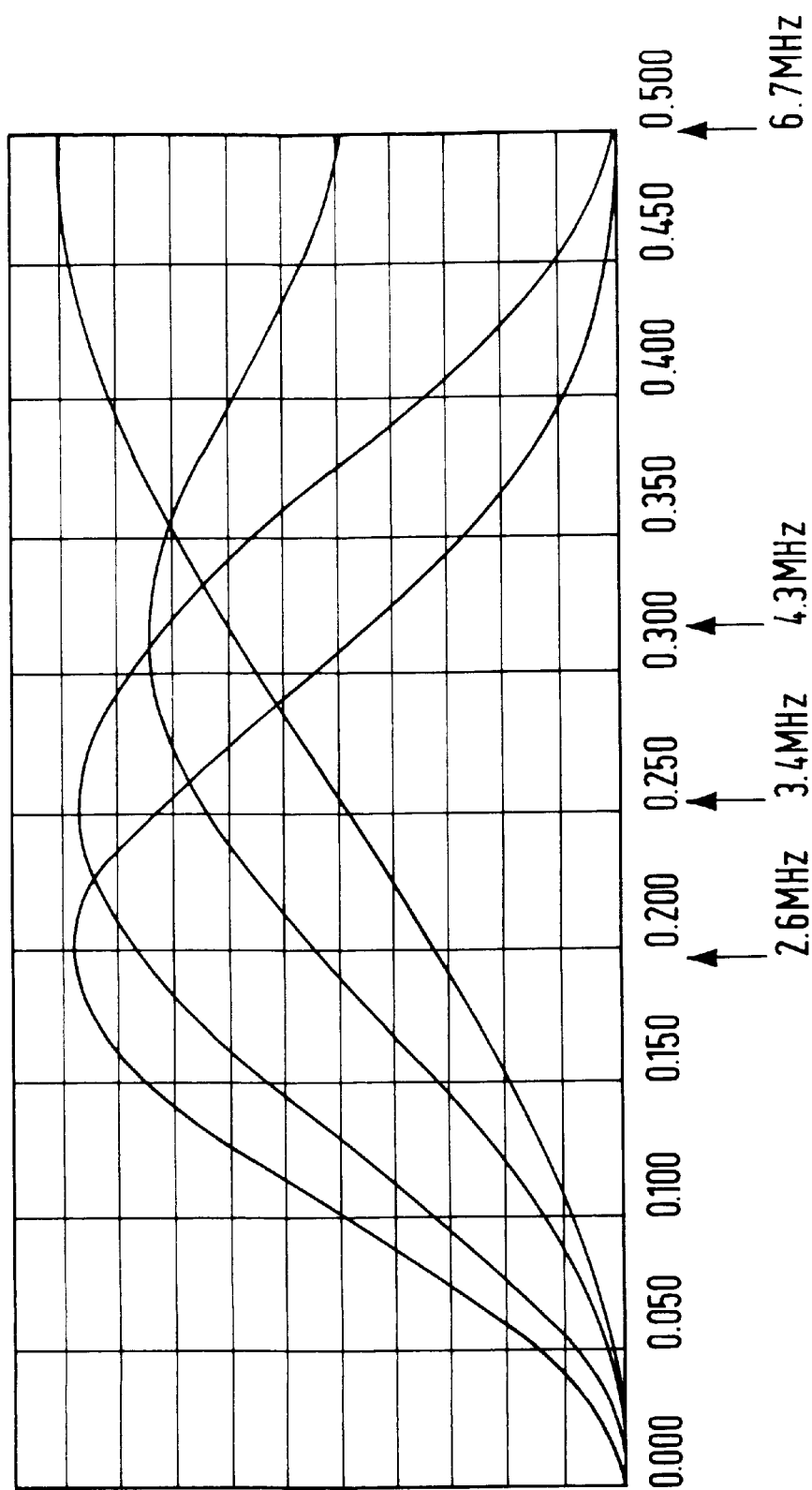
FIGS. 5 and 6 schematically illustrate filter responses.
Figure 6:
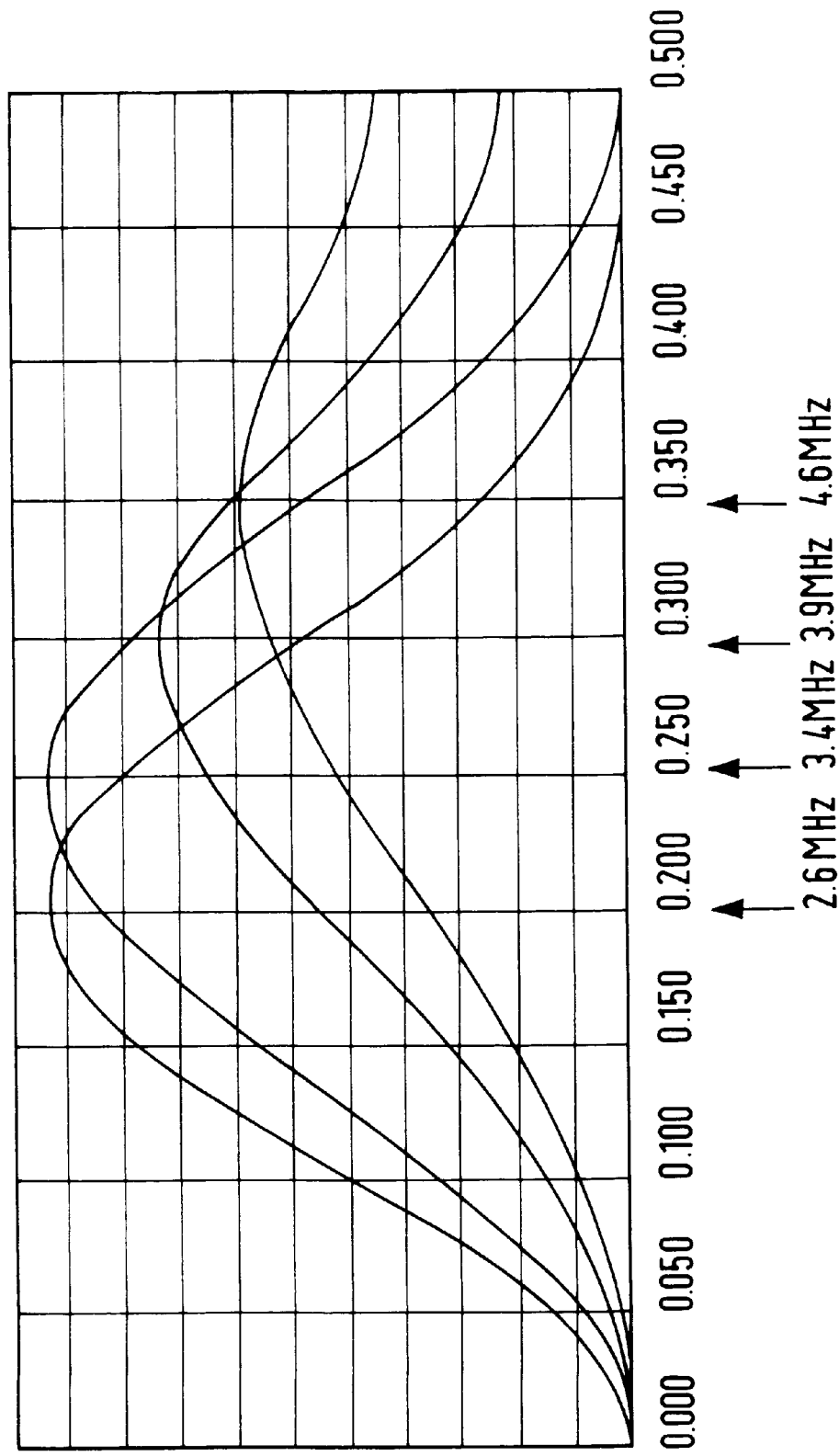

FIGS. 5 and 6 schematically illustrate filter responses in the apparatus of FIG. 3. In particular, FIG. 5 illustrates four selectable filter responses for the band-pass filters 170, having centre frequencies around 2.6 MHz, 3.4 MHz, 4.3 MHz and 6.7 MHz respectively. (These filter responses relate to standard definition television signals sampled at 13.5 MHz).

The effective filter responses applied to generate the detail signal are in fact a combination of the responses of the band-pass filters 170, the interpolation filter 190 and the decimation filter 290. When these responses are taken into account, the effective choice of filter responses have centre frequencies at about 2.6 MHz, 3.4 MHz, 3.9 MHz and 4.6 MHz.

Figure 7:
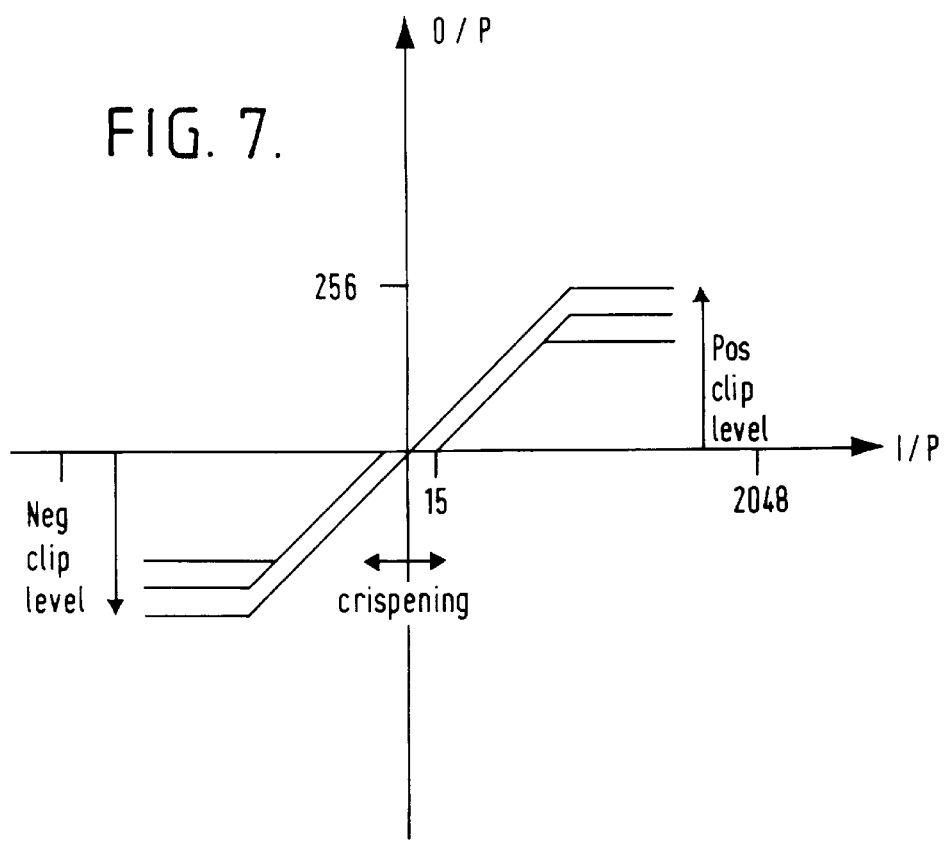
FIG. 7 schematically illustrates the operation of a clipping and crispening apparatus.

FIG. 7 schematically illustrates the operation of the clipping and crispening device 180. In FIG. 7, the input signal to the clipping and crispening device is represented along a horizontal axis (positive and negative values) and the output from the clipping and crispening device 180 is represented along a vertical axis (again, positive and negative values).

The clipping operation occurs so that once the input signal reaches a predetermined clipping level, the output signal does not rise beyond that clipping level. The clipping level is adjustable separately for positive and negative clipping operations.

The crispening operation is carried out to remove noise components from the detail signal, and has the effect that input signal of up to a crispening level are output as a zero level signal Input signals having a magnitude greater than the crispening level are output as the input level minus the clipping level (with corresponding arrangements for negative going signals).

Figure 8:
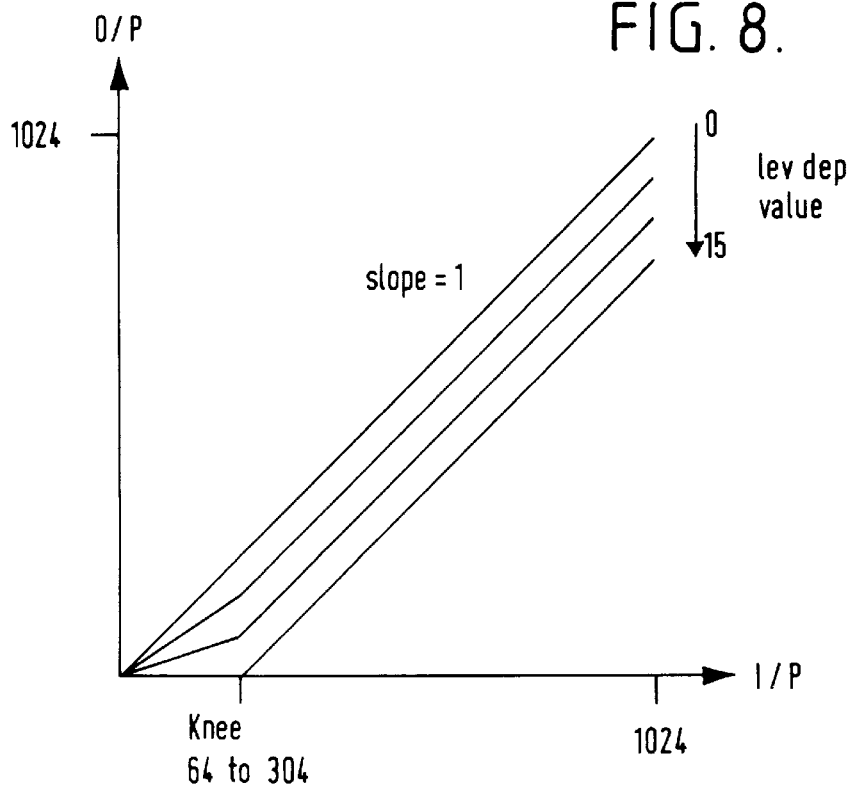
FIG. 8 schematically illustrates the operation of a level dependence apparatus.

Finally, FIG. 8 schematically illustrates the operation of the level dependence device 160. In FIG. 8, the input signal is represented along a horizontal axis and the output signal is represented along a vertical axis.

In this device, input signals of up to a "knee" value are scaled by a variable scaling factor. Signal levels above the "knee" value simply have a predetermined value subtracted from them.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Digital image enhancement apparatus for processing an input sampled image signal having an input sample rate to generate an output, enhanced, image signal at said input sample rate, said apparatus comprising:
   (i) one or more filters for filtering and sample rate up-converting said input image signal to generate a detail signal at an intermediate sample rate higher than said input sample rate and an intermediate image signal, said intermediate image signal being a sample rate up-converted version of said input image signal;
   (ii) a detecting circuit for detecting whether a combination of said detail signal and said intermediate image signal goes beyond predefined limits on the signal level of said output image signal and, if so, for modifying said detail signal so that a combination of said detail signal and said intermediate image signal would not go beyond said predefined limits on said signal level of said output image signal;
   (iii) a sample rate down-converter for converting said detail signal to a down-converted detail signal at said input sample rate; and
   (iv) a combiner for combining said input image signal with said down-converted detail signal at said input sample rater to generate said output image signal.

2. Apparatus according to claim 1, in which said detecting circuit comprises:
   (i) a first detector for detecting whether the combination of said detail signal and said intermediate image signal exceeds an upper signal level limit and, if so, for outputting a first modification signal representing the amount by which said combination of said detail signal and said intermediate image signal exceeds said upper signal level limit;
   (ii) a second detector for detecting whether said combination of said detail signal and said intermediate image signal is less than a lower signal level limit and, if so, for outputting a second modification signal representing the amount by which said combination of said detail signal and said intermediate image signal is less than said lower signal level limit; and
   (iii) a second combiner for combining said first and second modification signals with said detail signal.

3. Apparatus according to claim 1, comprising a comparator for detecting whether said intermediate digital signal exceeds a second upper signal limit and, if so, for replacing said detail signal by a predetermined replacement signal.

4. Apparatus according to claim 3, in which said replacement signal is a zero signal.

5. Apparatus according to claim 2, comprising a comparator for detecting whether said intermediate digital signal exceeds a second upper signal limit and, if so, for replacing said detail signal by a predetermined replacement signal.

6. Apparatus according to claim 5, in which said replacement signal is a zero signal.

7. A method of digital image enhancement for processing an input sampled image signal having an input sample rate, said method comprising the steps of:
   filtering and sample rate up-converting said input image signal to generate a detail signal at an intermediate sample rate higher than said input sample rate and an intermediate image signal, said intermediate image signal being a sample rate up-converted version of said input image signal;
   detecting whether a combination of said detail signal and said intermediate image signal goes beyond predefined limits on said signal level of said output image signal and, if so, modifying said detail signal so that a combination of said detail signal and said intermediate image signal would not go beyond said predefined limits on said signal level of said output image signal;
   sample rate down-converting said detail signal to a down-converted detail signal at said input sample rate; and
   combining said input image signal with said down-converted detail signal at said input sample rate, to generate an output image signal.

* * * * *